(12) United States Patent
Bertoni Scarton et al.

(10) Patent No.: US 11,551,173 B2
(45) Date of Patent: *Jan. 10, 2023

(54) RISK FAILURE PREDICTION FOR LINE ASSETS

(71) Applicant: International Business Machines Corporation, Armonk, NY (US)

(72) Inventors: Tiago Bertoni Scarton, Sao Paulo (BR); Thiago Bianchi, Sao Carlos (BR); Marlon Nascimento Vicente, Sao Paulo (BR); Tarcisio Pereira, Sao Paulo (BZ); Joao Souto Maior, Jaboatao dos Guararapes (BR); Thiago Roberto Fontes Iunes, Santos (BR)

(73) Assignee: International Business Machines Corporation, Armonk, NY (US)

( * ) Notice: Subject to any disclaimer, the term of this patent is extended or adjusted under 35 U.S.C. 154(b) by 544 days.

This patent is subject to a terminal disclaimer.

(21) Appl. No.: 16/410,176

(22) Filed: May 13, 2019

(65) Prior Publication Data

US 2020/0364635 A1 Nov. 19, 2020

(51) Int. Cl.
*G06Q 10/00* (2012.01)
*G01W 1/10* (2006.01)
*G06Q 10/06* (2012.01)
*G06N 7/00* (2006.01)

(52) U.S. Cl.
CPC .......... *G06Q 10/0635* (2013.01); *G01W 1/10* (2013.01); *G06N 7/005* (2013.01)

(58) Field of Classification Search
CPC ...................................................... G01W 1/10
See application file for complete search history.

(56) References Cited

U.S. PATENT DOCUMENTS

| | | | |
|---|---|---|---|
| 2009/0113049 A1 | 4/2009 | Nasle et al. | |
| 2014/0324495 A1 | 10/2014 | Zhou et al. | |
| 2016/0306075 A1* | 10/2016 | Heng | G06Q 10/06315 |
| 2016/0343093 A1* | 11/2016 | Riland | G06Q 50/06 |
| 2019/0096099 A1 | 3/2019 | Bertoni Scarton et al. | |

FOREIGN PATENT DOCUMENTS

| | | |
|---|---|---|
| CA | 3013828 A1 | 8/2017 |
| CN | 108345976 A | 7/2018 |

(Continued)

OTHER PUBLICATIONS

Polo et.al., Failure mode prediction and energy forecasting of PV plants to assist dynamic maintenance tasks by ANN based models, 2015, Renewable Energy, 81, 227-238 (Year: 2015).*

(Continued)

*Primary Examiner* — Rutao Wu
*Assistant Examiner* — Zahra Elkassabgi
(74) *Attorney, Agent, or Firm* — Jared Chaney

(57) ABSTRACT

Weather data, asset variable values, and failure data may be received. A correlation factor may be generated by comparing the weather data and the asset variable values. One or more weather variables may be selected based on the correlation factor. A predicted asset variable value may be determined based on the weather data and the selected weather variables. The weather data and the predicted asset variable values may be compared to predict a failure probability for a first asset segment.

13 Claims, 8 Drawing Sheets

(56) References Cited

FOREIGN PATENT DOCUMENTS

| WO | 2008133922 A1 | 11/2008 |
|---|---|---|
| WO | 2016073725 A1 | 5/2016 |

OTHER PUBLICATIONS

Johansson, Variation in Bread-Making Quality: Eþects of Weather Parameters on Protein Concentration and Quality in some Wheat Cultivars Grown Swedish during the Period 1975-1996, 1998, J Sci Food and Agri, 78, 109-118 (Year: 1998).*

Johansson, Variation in Bread-Making Quality: Eþ jects of Weather Parameters on Protein Concentration and Quality in some Wheat Cultivars Grown Swedish during the Period 1975-1996, 1998, J Sci Food and Agri, 78, 109-118 (Year: 1998 ) (Year: 2018).*

Bertoni Scarton et al., "Risk Failure Prediction for Line Assets," U.S. Appl. No. 16/515,079, filed Jul. 18, 2019.

List of IBM Patents or Patent Applications Treated as Related, Dated Jul. 12, 2019, 2 pages.

Maximo, "MapEngine Premier GIS Visualization for Maximo," esri Partner Network Silver, Printed Jan. 29, 2018, Copyright 2018—ActiveG, 4 pages, http://www-03.ibm.com/software/products/en/maximoassetmanagement.

Nilsson et al., "Maintenance Management of Wind Power Systems Using Condition Monitoring Systems—Life Cycle Cost Analysis for Two Case Studies," IEEE Transactions on Energy Conversion, vol. 22, No. 1, Mar. 2007, Digital Object Identifier 10.1109/TEC.2006.889623, 7 pages.

Zhang et al., "A Hybrid Prognostics and Health Management Approach for Condition-Based Maintenance," Proceedings of the 2009 IEEE IEEM, 2009, 978-1-4244-4870-9/09, Copyright 2009 IEEE, 5 pages.

Xu Han et al., "Optimization-Based Decision Support Software for a Team-in-the-Loop Experiment: Multilevel Asset Location," IEEE Transactions on Systems, Man, and Cybernetics: Systems, vol. 44, No. 8, Aug. 2014, 15 pages.

Khan et al., "Spatial Analysis of Weather Crash Patterns," Journal of Transportation Engineering, Copyright ASCE, May 2008, DOI: 10.1061/(ASCE)0733-947X(2008)134:5(191), 12 pages.

IBM, "Weather Company Data for IBM Bluemix APIs," Printed Jan. 29, 2019, Copyright 2016 IBM Corporation, 100 pages, https://twcservice.mybluemix.net/rest-api/.

OpenWeathermap, "Weather API," Printed Jan. 29, 2019, © 2012-2019 OpenWeather, 6 pages https://openweathermap.org/api.

Gartner, "Geographic Information System (GIS)," Printed Jan. 29, 2019, © 2019 Gartner, Inc. and/or its Affiliates, All Rights Reserved, 2 pages, http://www.gartner.com/it-glossary/geographic-information-systems-gis/.

Dempsey, "What is GIS?," GIS Lounge, Article last updated: Jan. 11, 2018. Article first written: Nov. 12, 1999, 5 pages, https://www.gislounge.com/what-is-gis/.

Bianchi et al., "Predictive Asset Maintenance," U.S. Appl. No. 16/130,892, filed Sep. 13, 2018.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

RISK FAILURE PREDICTION FOR LINE ASSETS

BACKGROUND

Aspects of the present disclosure relate to risk failure predictions; more particular aspects relate to predicting preventive maintenance requirements for linear assets.

When dealing with specific types of assets, failure prevention through preventive maintenance may lead to certain difficulties. Considering that, for some kind of assets, these faults can be influenced by climatic factors such as atmospheric pressure, temperature, storms, snow, wind, altitude, and others. In addition to that, some assets, known as linear assets, may demand different approaches since their composition may offer a new set of variables. Linear assets include rails, roadways, water connections, and other segmented structures.

SUMMARY

Some embodiments of the present disclosure can be illustrated by a method comprising receiving a data store including historical weather data, predicted weather data, historical asset variable values, and historical failure data associated with a plurality of asset segments, generating, by a comparison engine using regression analysis, a correlation factor between the historical weather data and the historical asset variable values, selecting one or more weather variables based on the correlation factor, determining a predicted asset variable value for a first asset segment of the plurality of asset segments based on the predicted weather data and the selected weather variables, comparing the historical weather data and the historical asset variable values to the historical failure data, and predicting, by a prediction engine, a failure probability for the first asset segment based on the predicted weather data and the predicted asset variable value.

Some embodiments of the present disclosure can also be illustrated by a computer program product comprising a computer readable storage medium having program instructions embodied therewith, the program instructions executable by a computer to cause the computer to receive a data store including historical weather data, predicted weather data, historical asset variable values, and historical failure data associated with a plurality of asset segments, generate, by a comparison engine using regression analysis, a correlation factor between the historical weather data and the historical asset variable values, select one or more weather variables based on the correlation factor, determine a predicted asset variable value for a first asset segment of the plurality of asset segments based on the predicted weather data and the selected weather variables, compare the historical weather data and the historical asset variable values to the historical failure data, and predict, by a prediction engine, a failure probability for the first asset segment based on the predicted weather data and the predicted asset variable value.

Some embodiments of the present disclosure can also be illustrated by a system comprising a processor and a memory in communication with the processor, the memory containing program instructions that, when executed by the processor, are configured to cause the processor to receiving a data store including historical weather data, predicted weather data, historical asset variable values, and historical failure data associated with a plurality of asset segments, generating, by a comparison engine using regression analysis, a correlation factor between the historical weather data and the historical asset variable values, selecting one or more weather variables based on the correlation factor, determining a predicted asset variable value for a first asset segment of the plurality of asset segments based on the predicted weather data and the selected weather variables, comparing the historical weather data and the historical asset variable values to the historical failure data, and predicting, by a prediction engine, a failure probability for the first asset segment based on the predicted weather data and the predicted asset variable value.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
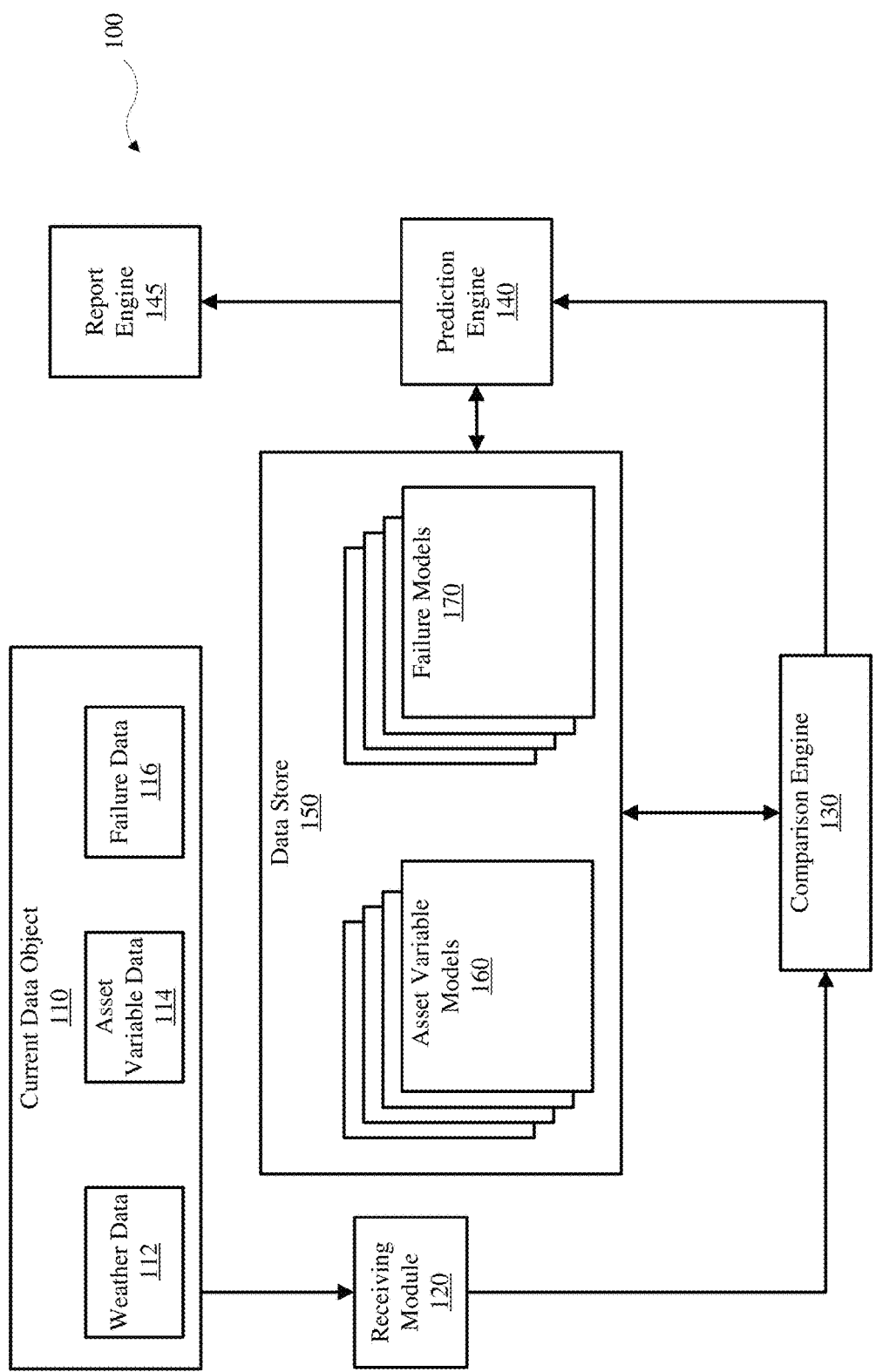
FIG. 1 is a block diagram illustrating components of a risk failure prediction system according to one illustrative embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to predicting risk of failure for line assets, more particular aspects relate to using meteorological data to predict failures for line assets. In some embodiments, a method for identifying line assets where problems are likely to occur is disclosed. In some embodiments, the method may also include a method for alerting an administrator or a user about potential problems in specific line asset segments. For example, after receiving a meteorological condition prediction from a weather service and line asset sensor readings through the internet of things, a system may update a failure risk assessment of a line asset segment and change a line asset segment's symbology (e.g., color, shape, or depiction) on a map. Then, the administrator, monitoring the map, can prepare a crew and take the necessary actions in order to avoid assets failures.

While the present disclosure is not necessarily limited to such applications, various aspects of the disclosure may be appreciated through a discussion of various examples using this context.

When dealing with line assets, such as rails, roadways, water connections, and other segmented structures, failure prevention through preventive maintenance can be costly and fail to adequately mitigate failure in high risk line asset segments. The line assets' failures are often caused or accelerated by certain climatic factors such as atmospheric pressure, temperature, storms, snow, wind, and altitude, among others. In some embodiments, a method is disclosed to combine those climatic factors with the asset readings from various line asset segments to predict future failures.

Some asset management systems (e.g., Enterprise Asset Management (EAM)) have a mechanism to schedule preventive maintenance, but such mechanisms are typically based solely on asset depreciation. A water company, for example, schedules preventative pipe maintenance to prevent leaks, which may waste time and resources. However, these systems are not able to accurately predict if and when to fix each section of the pipe or if one section of pipe is serviced more often than another. It is not necessary to service all sections of the pipe at the same frequency if pipe failures can be predicted.

EAM is a specific type of Enterprise Resource Planning (ERP) that is characterized by functionalities that are designed to support management activities of large scale assets, such as trucks, turbines, oil platforms, and nuclear reactors. EAM systems cover subjects including the design, construction, commissioning, operations, maintenance, and decommissioning/replacement of plants, equipment, and facilities.

A geographic information system (GIS) can be a collection of computer hardware, software, and geographic data for capturing, managing, analyzing and displaying forms of geographically referenced information, often called spatial data. A GIS can also be a computer system capable of assembling, storing, manipulating, and displaying geographically referenced information (i.e., data identified according to their locations). GIS technology integrates common database operations, such as query and statistical analysis, with the unique visualization and geographic analysis benefits offered by maps. Through the usage of such functionalities, a GIS user is capable of manipulating data defined in terms of points, lines, and areas to retrieve relevant information using ad hoc queries and analyses.

In some embodiments, a linear asset system can include sensors (such as temperature sensors, pressure sensors, humidity sensors, light sensors, etc.) connected to the internet of things environment. In some embodiments, the linear asset system can use the data from the sensors to predict future failures and allow scheduling of maintenance prior to the failure event thereby saving financial resources and even preventing hazardous situations to humans.

Linear assets, or horizontal assets move people, water, air, power, and or things from one place to another, and may have different variable conditions at different sections along their length. For example, roadways, train rails, and electricity lines may present varying values (e.g., height, precipitation, temperature, sun exposure, etc.) at different points along their length.

There are several weather application programming interface (API) services or weather services that handle data requests regarding climate or temperature. These services can be used to generate forecast data compatible with the information group used to perform predictions. In some embodiments, by crossing this kind of information with other meteorological sensor data, a user can perform a richer prediction through the computing system.

Artificial neural networks (ANNs) can be computing systems modeled after the biological neural networks found in animal brains. Such systems learn (i.e., progressively improve performance) to do tasks by considering examples, generally without task-specific programming. For example, in image recognition, ANNs might learn to identify images that contain cats by analyzing example images that have been manually labeled as "cat" or "no cat" and using the analytic results to identify cats in other images.

In some embodiments of the present disclosure, neural networks may be used to predict failures for line assets based on meteorological data or weather data. Neural networks may be trained to recognize patterns in input data by a repeated process of propagating training data through the network, identifying output errors, and altering the network to address the output error. Training data may be propagated through the neural network, which recognizes patterns in the training data. Those patterns may be compared to patterns identified in the training data by the human annotators in order to assess the accuracy of the neural network. In some embodiments, mismatches between the patterns identified by a neural network and the patterns identified by human annotators may trigger a review of the neural network architecture to determine the particular neurons in the network that contribute to the mismatch. Those particular neurons may then be updated (e.g., by updating the weights applied to the function at those neurons) in an attempt to reduce the particular neurons' contributions to the mismatch. In some embodiments, random changes are made to update the neurons. This process may be repeated until the number of neurons contributing to the pattern mismatch is slowly reduced, and eventually, the output of the neural network changes as a result. If that new output matches the expected output based on the review by the human annotators, the neural network is said to have been trained on that data.

In some embodiments, once a neural network has been sufficiently trained on training data sets for a particular subject matter, it may be used to detect patterns in analogous sets of live data (i.e., non-training data that has not been previously reviewed by human annotators, but that are related to the same subject matter as the training data). The neural network's pattern recognition capabilities can then be used for a variety of applications. For example, a neural network that is trained on a particular subject matter may be configured to review live data for that subject matter and predict the probability that a potential future event associated with that subject matter may occur.

In some embodiments, a multilayer perceptron (MLP) is a class of feedforward artificial neural networks. An MLP consists of, at least, three layers of nodes: an input layer, a hidden layer, and an output layer. Except for the input nodes, each node is a neuron that uses a nonlinear activation function. MLP utilizes a supervised learning technique called backpropagation for training. Its multiple layers and non-linear activation distinguish MLP from a linear perceptron. It can distinguish data that is not linearly separable. Also, MLP can be applied to perform regression operations.

However, accurate event prediction for some line assets relies on processing live data sets that contain large amounts of data. For example, live data sets could include various sources of metrological data or line conditions (such as weather data from local sensors and weather data from a national weather service or sensors on the line assets).

Further, achieving accurate predictions for some subject matters is difficult due to the amount of data that may be relevant to a prediction. For example, the relevance of many sensor readings to a prediction may be based almost solely on the distance of the sensor from a linear asset section. Computer-based event prediction systems such as neural networks are not currently capable of utilizing data target predictions due, in part, to a difficulty in differentiating weather data that is likely to be relevant to a target prediction from weather data that is likely to be irrelevant to a target prediction. Without the ability to identify relevant weather data, the incorporation of weather analysis into neural-network prediction of line asset failures may lead to inaccuracies. Training neural networks to overcome these inaccuracies may be challenging, or impractical, in many instances.

The amount of data that may be necessary for accurate prediction analysis may be sufficiently large for many subject matters that analyzing the data in a reasonable amount of time may be challenging. Further, in many subject matters, large amounts of data may be made available frequently (e.g., daily), and thus data may lose relevance quickly. For this reason, human reviewers are not an effective means by which relevant weather data may be identified for the purposes of prediction analysis. Therefore, an event-prediction solution that is capable of analyzing large amounts of data, selecting the line and weather data that is relevant to a target prediction, and incorporating that data into a prediction can be useful.

Some embodiments of the present disclosure may improve upon neural-network predictive modeling by incorporating multiple specialized neural networks into a larger neural network that, in aggregate, is capable of analyzing large amounts of data from multiple line asset segments. In some embodiments, multiple target predictions may be determined by the overall neural network and combined with structured data in order to predict the likelihood of a value at a range of confidence levels. In some embodiments, these neural networks may be any type of neural network. For example, "neural network" may refer to a classifier-type neural network, which may predict the outcome of a variable that has two or more classes (e.g., pass/fail, positive/negative/neutral, or complementary probabilities (e.g., 60% pass, 40% fail)). For example, pass may denote "no maintenance/service needed" and fail may denote "maintenance/service needed." "Neural network" may also refer to a regression-type neural network, which may have a single output in the form, for example, of a numerical value.

In some embodiments, for example, a neural network in accordance with the present disclosure may be configured to generate a prediction of the probability of a target event (i.e., the event for which a probability is sought in a target prediction) related to a particular set of conditions for a line asset. This configuration may comprise organizing the component neural networks to feed into one another and training the component neural networks to process data related to the subject matter. In embodiments in which the output of one neural network may be used as the input to a second neural network, the transfer of data from the output of one neural network to the input of another may occur automatically, without user intervention.

For example, in some embodiments, a predictive neural network may be utilized to predict the numerical probability that a particular section of a line asset may fail within a given maintenance schedule. The predictive neural network may be composed of multiple component neural networks that are complementarily specialized. For example, a first component neural network may be specialized in analyzing meteorological or weather conditions to determine what meteorological data is relevant to one or more asset variables (e.g., data collected by sensors at a section of a line asset), and to predict the one or more asset variables. For example, a second component neural network may be specialized in analyzing data related to failures (e.g., failure reports, maintenance reports, maintenance requests, repair reports, repair requests, outage reports, etc.) and determine the likelihood of a failure based on weather conditions. One such entity, for example, may be the number of times a particular segment has failed in a given time period and what weather conditions precede the failure.

In some embodiments, using the disclosed method, companies can manage maintenance on the line asset based on weather conditions that may influence certain sections of the line assets. For example, if a company has a warning that during storms some part of a road can be blocked due to floods, the company can prepare sections of the asset for extreme weather conditions and advise users about the possible outage. Likewise, in some embodiments, if a segment is exposed to certain environmental conditions (e.g., heat and humidity) for prolonged periods, it may increase the failure risk (FR) for the segment. In some embodiments, FR is a numerical value representing the risk of failure, where 1 represents a 100% chance of failure and a 0 represents a 0% chance of failure. An increased FR may be used to move up a maintenance or replacement schedule for a segment. Alternatively, in some instances, if a segment experiences mild conditions it may lower a FR and indicate that a maintenance or replacement schedule for a segment may be moved back or delayed.

FIG. 1 is a block diagram illustrating components of a risk failure prediction system 100 according to one illustrative embodiment. The risk failure prediction system 100 includes a current data object 110 with weather data 112, asset variable data 114, and failure data 116, a receiving module 120, a comparison engine 130, a prediction engine 140, a data store 150 with a multiple of asset variable models 160 and failure models 170, and a reporting engine 145.

In some embodiments, the receiving module 120 may receive data in current data object 110. In some embodiments, weather data 112 is retrieved from a weather server or meteorological data provider. In some embodiments, asset variable data 114 and failure data 116 are received from an asset database or server. In some embodiments, asset variable data 114 is historical and/or current data from sensors on or near the asset. In some embodiments, failure data may be historical failures or problems with a segment of a line asset recorded in a database. Current data object 110 may include historical data that corresponds to asset degradation and failure events. Accordingly, the risk failure prediction system 100 may use the current data object 110 to select which sensor data and meteorological data elements are predictive of (relevant to) such events. Data elements that are not predictive of such events may be discarded and/or not collected in the future.

In some embodiments, selection of the predictive sensor data and meteorological data elements can include determining correlation coefficients between degradation and failure data and the sensor and/or meteorological data elements. In one embodiment, the correlation coefficients are Spearman's rank correlation coefficients.

In statistics, Spearman's rank correlation coefficient or Spearman's rho is a nonparametric measure of rank correlation (statistical dependence between the ranking of two variables). It assesses how well the relationship between two variables can be described using a monotonic function. The Spearman correlation between two variables is equal to the Pearson correlation between the rank values of those two variables; while Pearson's correlation assesses linear relationships, Spearman's correlation assesses monotonic relationships (whether linear or not). If there are no repeated data values, a perfect Spearman correlation of +1 or −1 occurs when each of the variables is a perfect monotone function of the other.

In some embodiments, comparison engine 130 compares weather data 112 to asset variable data 114. In some embodiments, the comparison is used to create correlation coefficients between weather data 112 and asset variable data 114. In some embodiments, comparison engine 130 creates asset variable models, such as asset variable models 160, from the comparison of weather data 112 to asset variable data 114 and stores the models in data store 150. In some embodiments, the risk failure prediction system 100 uses the asset variable models 160 to train a first neural network to predict weather data and asset variables. In some embodiments, prediction engine 140 performs the prediction of future weather data and future asset variables.

In some embodiments, comparison engine 130 compares weather data 112 and asset variable data 114 to failure data 116. In some embodiments, comparison engine 130 creates failure models, such as failure models 170, from the comparison and stores the failure models 170 in data store 150. In some embodiment, the risk failure prediction system 100 uses the failure models 170 to train a second neural network to predict a failure of an asset segment. In some embodiments, prediction engine 140 performs the prediction of the failure of an asset.

In some embodiments, report engine 145 generates a report describing the prediction of an asset failure. In some embodiments, the report engine 145 graphically displays a predicted asset segment failure rate (FR) on a map.

As new data objects are discovered or analyzed, those data objects and their corresponding features may be added to data store 150, thus more models may be added to asset variable models 160 and failure models 170. In some embodiments, data store 150 includes data objects not relevant to asset variables or FR. For example, intelligence data store 150 may have a list of one or more weather variables that do not affect asset variables or FR.

In some embodiments, risk failure prediction system 100 uses a deep belief network with two or more hidden layers in order to improve the value of limited labeled training data to train on each isomorphism.

Figure 2:
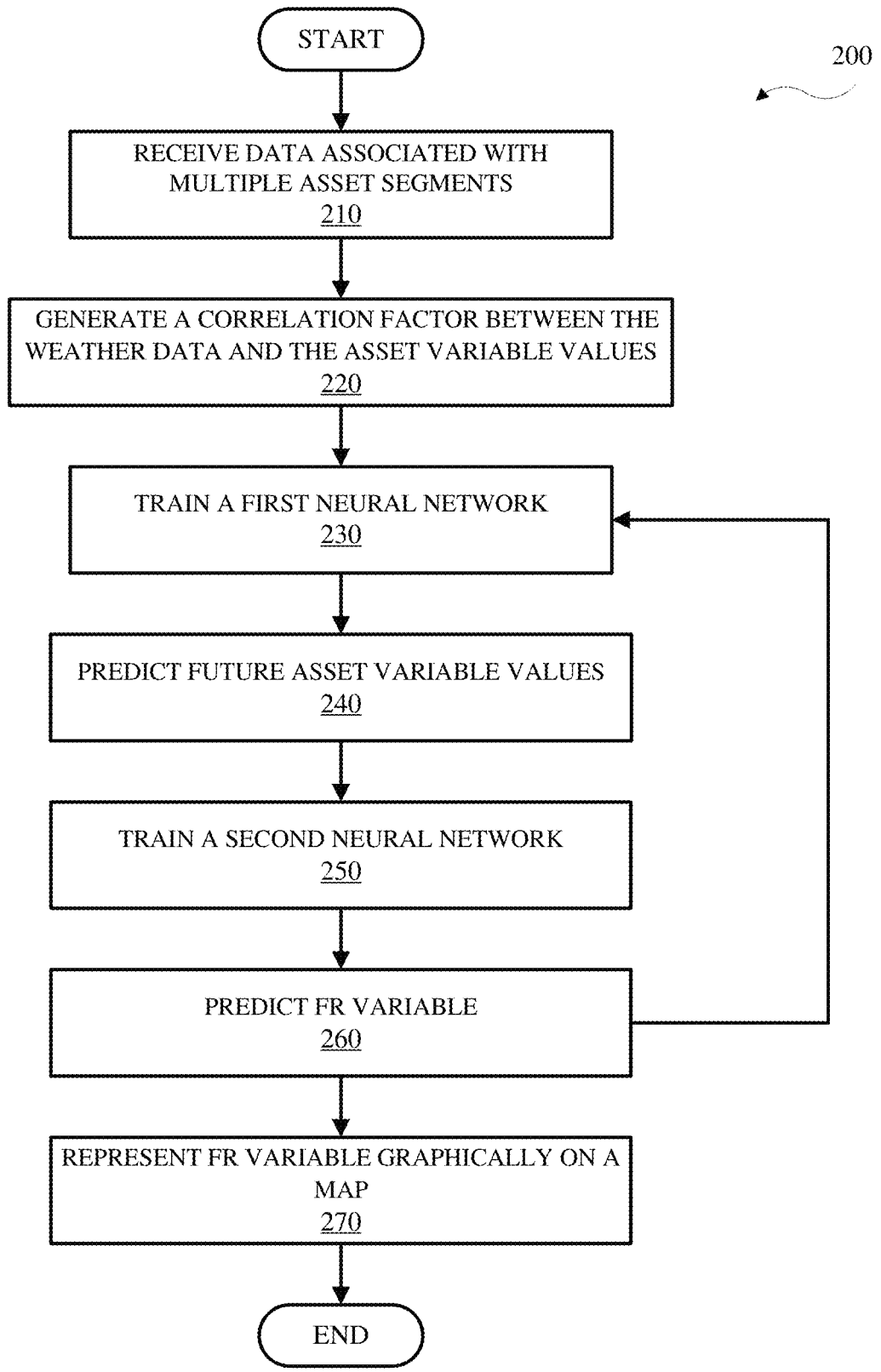
FIG. 2 illustrates an example method of obtaining a predicted probability of a failure of a linear asset segment, in accordance with embodiments.

FIG. 2 illustrates an example method 200 of obtaining a predicted probability of a failure of a linear asset segment. In some embodiments, the method 200 can be performed by a risk failure prediction system (e.g., risk failure prediction system 100) that uses a predictive neural network that comprises several specialized neural-network components. Table 1 illustrates example variables that are used to describe FIG. 2. In table 1, the following abbreviations are used:

$AN_i$: The A identifies the asset variable (e.g., sensor reading), the "N" identifies the number of the line asset segments, and "i" subscript identifies the number of sensors attached to this asset.

$WN_i$: the "W" identifies the weather variable, the "N" identifies the number of the line asset segments, and "i" subscript identifies the number of weather variables considered for this asset;

$AN_i(K)$: $k^{th}$ observation of variable "i" of the "N" segment of Asset A. For example, the variable $A2_3(5)$ identifies the 5th observation of the 3rd asset variable of the 2nd line asset segment;

RS (Relevant segments): number of line asset segments to be considered. If RS is zero, only the current segment may be used, if greater than zero, the N relevant segments may be used. RS is not shown in the table, but is used to determine how many relevant asset segments are used for the future predictions and the failure risk. In some embodiments, relevant segments may be segments with one or more similar features. For example, relevant segments might be adjacent segments (e.g., a similar location), segments built at the same time, and/or segments with one or more similar characteristics (e.g., pipeline junctions, altitude, composition of surrounding ground, etc.)

HS (Horizon of Steps): number of observations that may be predicted by the first neural network; and FRN (Failure Risk): identifies the risk of failure of the line asset segment "N" that may be predicted by the second neural network. In some embodiments, for the historical data, the FR may either be a 1 for a failure or a 0 for no failure. In some embodiments, for the prediction data, the FR variable may be between 0 and 1, where the closer the value is to 1 the more likely that a failure may occur.

| Variables | HISTORICAL DATA OBSERVATIONS | | | | | Future Prediction Horizon of Steps (HS) | |
|---|---|---|---|---|---|---|---|
| $A1_1$ | $A1_1(1)$ | $A1_1(2)$ | $A1_1(3)$ | $A1_1(4)$ | $A1_1(k)$ | | |
| $A1_2$ | $A1_2(1)$ | $A1_2(2)$ | $A1_2(3)$ | $A1_2(4)$ | $A1_2(k)$ | | |
| $A1_3$ | $A1_3(1)$ | $A1_3(2)$ | $A1_3(3)$ | $A1_3(4)$ | $A1_3(k)$ | | |
| $W1_1$ | $W1_1(1)$ | $W1_1(2)$ | $W1_1(3)$ | $W1_1(4)$ | $W1_1(k)$ | | |
| $W1_2$ | $W1_2(1)$ | $W1_2(2)$ | $W1_2(3)$ | $W1_2(4)$ | $W1_2(k)$ | | |
| $W1_3$ | $W1_3(1)$ | $W1_3(2)$ | $W1_3(3)$ | $W1_3(4)$ | $W1_3(k)$ | | |
| FR1 | FR1(1) | FR1(2) | FR1(3) | FR1(4) | FR1(k) | | |
| $A2_1$ | $A2_1(1)$ | $A2_1(2)$ | $A2_1(3)$ | $A2_1(4)$ | $A2_1(k)$ | $A2_1(k + 1)$ | $A2_1(k + 2)$ |
| $A2_2$ | $A2_2(1)$ | $A2_2(2)$ | $A2_2(3)$ | $A2_2(4)$ | $A2_2(k)$ | $A2_2(k + 1)$ | $A2_2(k + 2)$ |
| $A2_3$ | $A2_3(1)$ | $A2_3(2)$ | $A2_3(3)$ | $A2_3(4)$ | $A2_3(k)$ | $A2_3(k + 1)$ | $A2_3(k + 2)$ |
| $W2_1$ | $W2_1(1)$ | $W2_1(2)$ | $W2_1(3)$ | $W2_1(4)$ | $W2_1(k)$ | $W2_1(k + 1)$ | $W2_1(k + 2)$ |
| $W2_2$ | $W2_2(1)$ | $W2_2(2)$ | $W2_2(3)$ | $W2_2(4)$ | $W2_2(k)$ | $W2_2(k + 1)$ | $W2_2(k + 2)$ |
| $W2_3$ | $W2_3(1)$ | $W2_3(2)$ | $W2_3(3)$ | $W2_3(4)$ | $W2_3(k)$ | $W2_3(k + 1)$ | $W2_3(k + 2)$ |
| FR2 | FR2(1) | FR2(2) | FR2(3) | FR2(4) | FR2(k) | FR2(k + 1) | FR2(k + 2) |
| $A3_1$ | $A3_1(1)$ | $A3_1(2)$ | $A3_1(3)$ | $A3_1(4)$ | $A3_1(k)$ | | |
| $A3_2$ | $A3_2(1)$ | $A3_2(2)$ | $A3_2(3)$ | $A3_2(4)$ | $A3_2(k)$ | | |
| $A3_3$ | $A3_3(1)$ | $A3_3(2)$ | $A3_3(3)$ | $A3_3(4)$ | $A3_3(k)$ | | |
| $W3_1$ | $W3_1(1)$ | $W3_1(2)$ | $W3_1(3)$ | $W3_1(4)$ | $W3_1(k)$ | | |
| $W3_2$ | $W3_2(1)$ | $W3_2(2)$ | $W3_2(3)$ | $W3_2(4)$ | $W3_2(k)$ | | |
| $W3_3$ | $W3_3(1)$ | $W3_3(2)$ | $W3_3(3)$ | $W3_3(4)$ | $W3_3(k)$ | | |
| FR3 | FR3(1) | FR3(2) | FR3(3) | FR3(4) | FR3(k) | | |

At block 210, the risk failure protection system may receive data associated with multiple asset segments, such as, for example, weather data 112, asset variable data 114, and failure data 116. For example, the weather data 112 may include atmospheric pressure, temperature, precipitation, and wind speed; asset variable values may include deterioration inspection, temperature at a sensor, impedance, and/or pressure among others; and failure risk may be a failure probability for a line segment. In some embodiments, the weather data includes historical weather data, current weather data, and predicted weather data. In some embodiments, the historical weather data includes weather data from a weather service for the geographical region of the particular asset segment, the current weather data includes weather data from a weather service for the geographical region of the particular asset segment, and the predicted weather data includes weather predictions from a weather service for the geographical region of the particular asset segment. In some embodiments, weather data may be for a general geographic region. In some embodiments, more specific geographical data for an area immediately surrounding an asset segment may be available.

The data received in block 210 can include unstructured data and/or structured data (e.g., predictions for the probability of the target event from other prediction sources). In some embodiments, this unstructured data may be a compilation of information that may be relevant to the subject matter and weather sources such as weather databases reports, error logs, and/or failure reports for one or more line asset sections. In some embodiments, the structured data may include predictions that are analogous to the target prediction (e.g., predictions for other, related events) or predictions of the probability of the same event, but generated by a different source (e.g., different line asset). In some embodiments, the structured data and unstructured data may be obtained simultaneously, one after the other, or continually. For example, in some embodiments, the structured and unstructured data may be part of a database that is updated periodically as new data sources are discovered (e.g., new line readings, new weather reports, new error logs, and new failure studies). This may be beneficial with regards to subject matters about which relatively large amounts of data are produced regularly, as may be true in weather reports, line failure reports, line maintenance reports, and sensor readings.

At block 220, the risk failure prediction system generates a correlation factor between the weather data 112 and the asset variable data 114. Historical data for the asset variables and the weather data may be compared to determine what weather parameters affect the asset variables and thus may be used to predict the asset variables. In some embodiments, a Spearman's rank correlation coefficient is used to compare each weather variable, W, with each sensor reading of the asset, A. This coefficient may return values between minus one and one (i.e., between −1 and 1). In some embodiments, when asset variable and the weather variable being tested have a strong positive correlation, the coefficient may return a positive value near of one. Conversely, if the two variables have a strong negative correlation, the coefficient may return a negative value near of minus one. In some embodiments, a threshold parameter may be set to determine if there is a meaningful correlation between two variables. For example, a weather variable may have meaningful correlation with an asset variable if it is from −1 to −0.8 or from 0.8 to 1. In some embodiments, weather variables that do not have a meaningful correlation may not be considered.

At block 230, the risk failure prediction system can train a first neural network. After confirming the variable dependency using the Spearman's rank correlation, the risk failure prediction system may use a neural network to learn from the comparison of the weather data to the asset variables (e.g., readings of several asset's data sensors) and perform a regression in order to predict the values according to a predetermined horizon of steps. In some embodiments, the nature of this training may vary based on, for example, the specialization of the component neural networks being trained, the input processed by those neural networks, or the output generated by those neural networks.

In some embodiments, the trained neural network may be a multilayer perceptron neural network. In such embodiments, this first multilayer perceptron neural network may be trained using all the asset's data and may be enriched by the weather parameters. In some embodiments, it is possible to train this first neural network using not only the variables of the current line asset segment, but also considering the dependency of this segment with their relevant segments by applying the variable relevant segments (RS). RS is the number of line asset segments to be considered. If RS is zero, only the current segment may be used, if RS is greater than zero, then RS segments adjacent to the current segment may be used.

Figure 3:
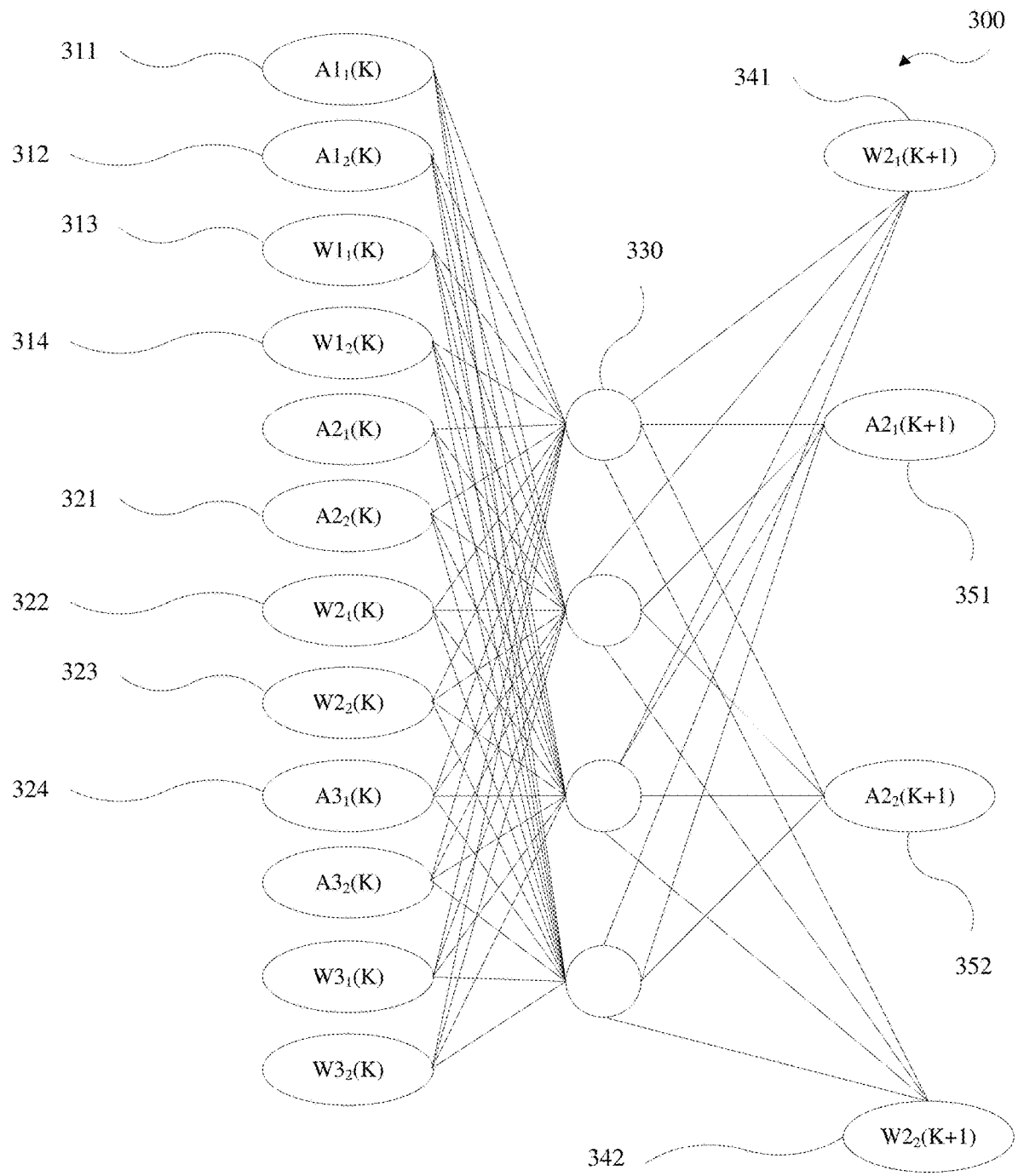
FIG. 3 depicts an example neural network that may be configured to determine asset variables and weather data, in accordance with embodiments.

For the sake of clarity, training neural network is further described with respect to FIG. 3, which illustrates an example first neural network 300 configured to determine asset variables and weather data. In some embodiments, the first neural network 300 may be multiple neural networks, each trained to predict a different future asset value. In an example, the neural network may be configured using the following nodes:
  Neurons for each line asset included in each asset segment of the input layer (e.g., neurons 311, 312, 313, and 314 for the first asset segment, neurons 321, 322, 323, and 324 for the second asset segment, etc.): the number of neurons of the input layer is equal to the number of variables received and used;
  Neurons of the hidden layer (e.g., neuron 330): the number of neurons of the hidden layer can vary depending on the complexity of data;
  Neurons 341 and 342 for weather conditions (e.g., from an API service) may be predicted by the first neural network 300 if unavailable, or may be fed into the trained neural network help predict the asset segment variables if available; and
  Neurons 351 and 352 of the output layer are the predicted asset segment variables.

In some embodiments, this first neural network 300 would therefore be trained to understand the relations from one variable (e.g., weather variables) to another (e.g., asset variables), to identify, in the corpus of data sources, a list of entities that are relevant to the target prediction. In some embodiments, the first neural network 300 may be configured to ingest a corpus of data sources related to the subject matter (e.g., weather conditions and sensor readings) and output a probability that one data type is related to another. Correlations can be calculated to relate a number of weather variables and asset variables. The corpus of data may include these correlations.

In some embodiments, structured and unstructured data may be obtained prior to the neural network being trained in block 230. In these embodiments, a portion of the structured and unstructured data may be utilized in training the neural network. This may be suitable, for example, for predictions related to subject matters for which a very large amount of data exists, but for which the data does not change frequently. In some embodiments, some of the structured and unstructured data may be obtained continually and the first neural network may continue to be trained as new information is received.

Referring back to FIG. 2, in block 240, prediction weather data received in block 210 is processed to predict future asset variable values. In some embodiments, using first neural network 300 trained with the historical data is used with the predicted weather variable data (e.g., $W2_1(k+1)$, $W2_1(k+2)$, $W2_2(k+1)$, $W2_2(k+2)$, $W2_3(k+1)$, $W2_3(k+2)$) obtained from a weather service) to predict the future asset variable values ($A2_1(k+1)$, $A2_1(k+2)$, $A2_2(k+1)$, $A2_2(k+2)$, $A2_3(k+1)$, and/or $A2_3(k+2)$). In some embodiments, the historical data is input into first neural network 300 to predict the asset variable data and the weather variable data. In some embodiments, the weather variable data determined by the neural network may be replaced once it is available.

Figure 4:
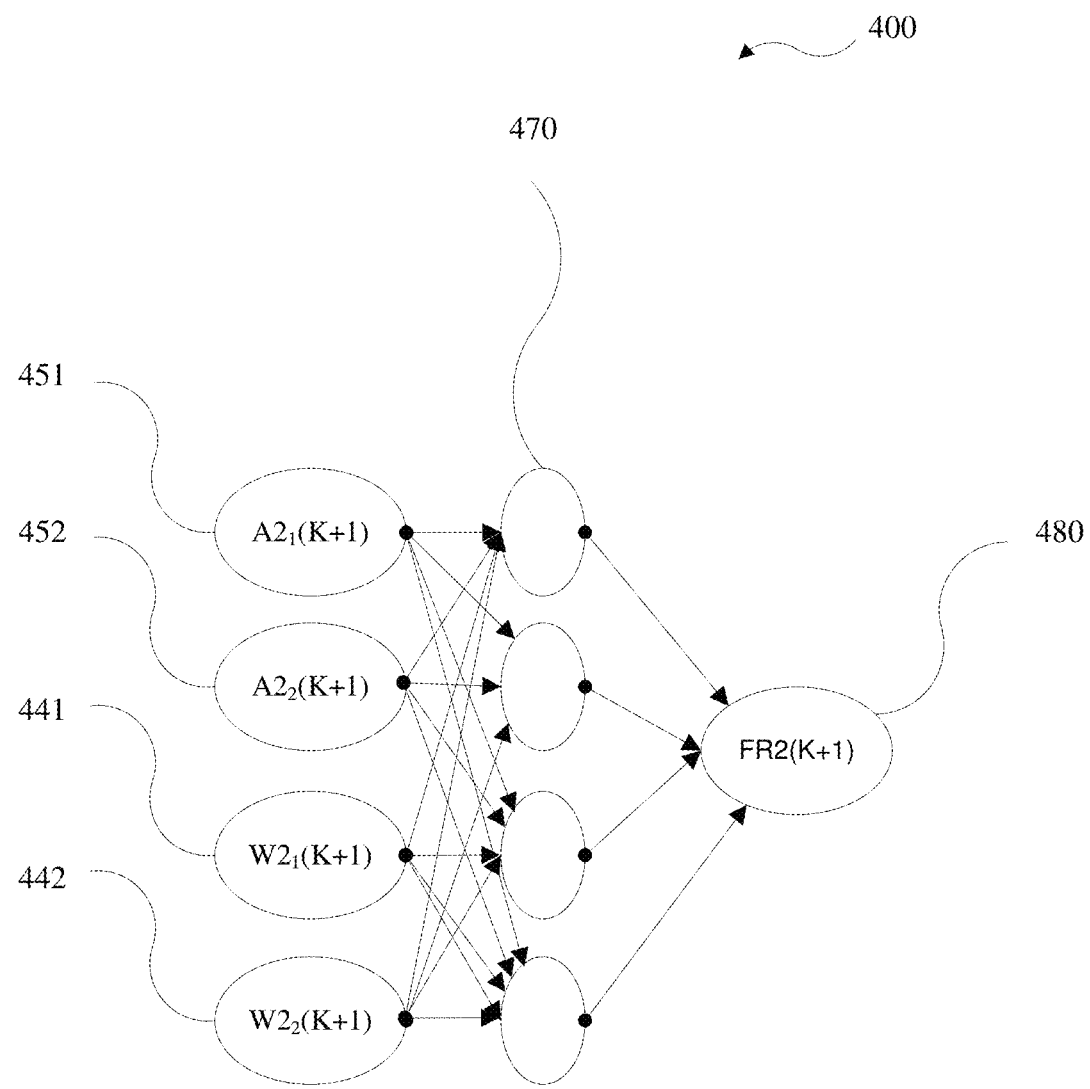
FIG. 4 depicts an example neural network that may be configured to predict failure rate, in accordance with embodiments.

In block 250, a risk failure prediction system trains a second neural network using weather data, asset variables, and historical (FR) variables. For clarity, the training of the second neural network in block 250 is described with respect to FIG. 4, which illustrates a second neural network 400 that is used to predict future FR variables. In some embodiments, FR variable data on the historical data may be 1 for the period when a failure occurs and 0 otherwise, since the historical failures of a segment are known. This value may be used to train the second neural network. FIG. 4 depicts an example configuration of second neural network 400. Example parameters of second neural network 400 follow:

Neurons 451, 452, 441, and 442 represent the predicted asset variables and weather data of the input layer. In some embodiments, more or fewer asset variables than depicted in FIG. 4 may be used. In some embodiments, neurons 451, 452, 441, and 442 are received from first neural network 300. In some embodiment, neurons 451 and 452, are received from first neural network 300 and neurons 441 and 442 are received from another source (e.g., a weather service).

Neuron 470 is a hidden layer neuron. The number of hidden layer neurons, such as neuron 470, can vary depending on the complexity of the data; and Neuron 480 is the output neuron for the FR variable. In some embodiments, only one FR variable may be generated at any one time for an asset segment.

In some embodiments, historical weather data, assets data and FR variables are used to train the second neural network. For example, second neural network 400 may receive data for asset segments adjacent to the selected segment and second neural network 400 may use the weather data, asset data, and failure data of the adjacent segments to train the neural network to predict FR for the selected segment.

In some embodiments, only FR variables for the current asset segment (e.g., FR2 may be used to train second neural network 400. For example, it may be determined that although the weather data for the adjacent segments is relevant to the weather data for the current segment, the FR variable data for the adjacent segments is not correlative to the failure rates of the current segment.

In some embodiments, FR variable data for other segments (e.g., adjacent segment's FR such as FR1 and FR3) may also be used to train the second neural network.

Referring back to FIG. 2, in block 260, second neural network 400 may predict a FR variable for first asset segment. For example, based on the predicted weather data and the predicted asset segment variables, the FR variable may be predicted.

In some embodiments, blocks 230-260 may be repeated for each asset segment.

In block 270, the FR variable may be graphically represented on a map. In some embodiments, graphical representations may indicate that a FR variable for a certain asset segment has surpassed a threshold variable. For example, variables above a first threshold may indicate that the line may likely need servicing. In some embodiments, there may be multiple variables each indicating a different risk to an asset segment. For example, a first threshold may be set at 0.8 and indicate that it is likely that an asset segment may require servicing, and a second threshold set at 0.6 may indicate that it may be likely that a segment may require servicing. In some embodiments, one or more characteristics of a map may be modified to indicate the FR variable for one or more asset segments. For example, the color depiction of the asset segments may be modified (e.g., red for "likely to need servicing," yellow for "may need servicing," and black or green for "lines that are not likely to require servicing"). For example, a triple line may indicate an asset segment probably needs servicing, a double line may indicate that an asset segment may need servicing, and a solid line may indicate that an asset segment probably does not need servicing. In some embodiments, the map may be displayed on a display screen and may therefore use animated characteristics to display the FR variables. For example, a rapidly blinking line may indicate an asset segment probably needs servicing, a slowly blinking line may indicate that an asset segment may need servicing, and a solid line may indicate that an asset segment probably does not need servicing.

Figure 5:
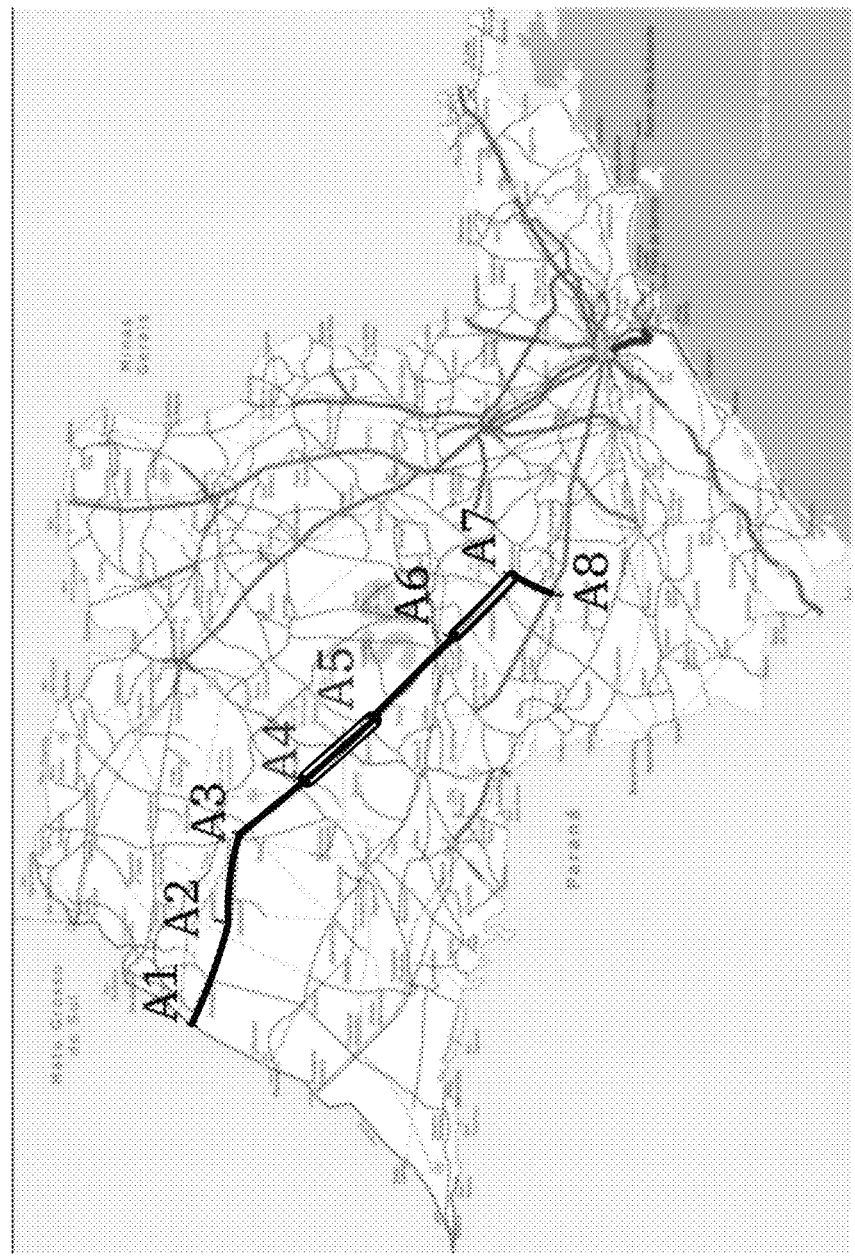
FIG. 5 illustrates a representation of a map used to indicate failure rate information.

FIG. 5 illustrates an example map 500 that has been modified to indicate FR variable information. In some embodiments, a physical quality of the map may be changed to indicate that the FR variable is greater than a threshold. In some embodiments, an FR variable surpassing a first threshold may indicate that an asset segment is likely to need servicing. For example, asset segment A4-A5 has a predicted FR variable of 0.85 and the first threshold has been set at 0.80. Since the FR variable has exceeded the first threshold, the asset segment A4-A5 is displayed as a triple line indicating that asset segment A4-A5 needs servicing. In some embodiments, there may be multiple thresholds indicating a variety of servicing needs. For example, asset segment A6-A7 has a predicted FR variable of 0.65 and a second threshold, indicating that a line should be monitored or have its service date moved up, has been set at 0.60. Since the FR variable has exceeded the first threshold, the asset segment A6-A7 is displayed as a double line indicating that asset segment A6-A7 should be monitored. In the example shown in FIG. 5, asset segments A1-A2, A2-A3, A3-A4, A5-A6, and A7-A8 have a single solid line indicating that they do not need servicing.

Figure 6:
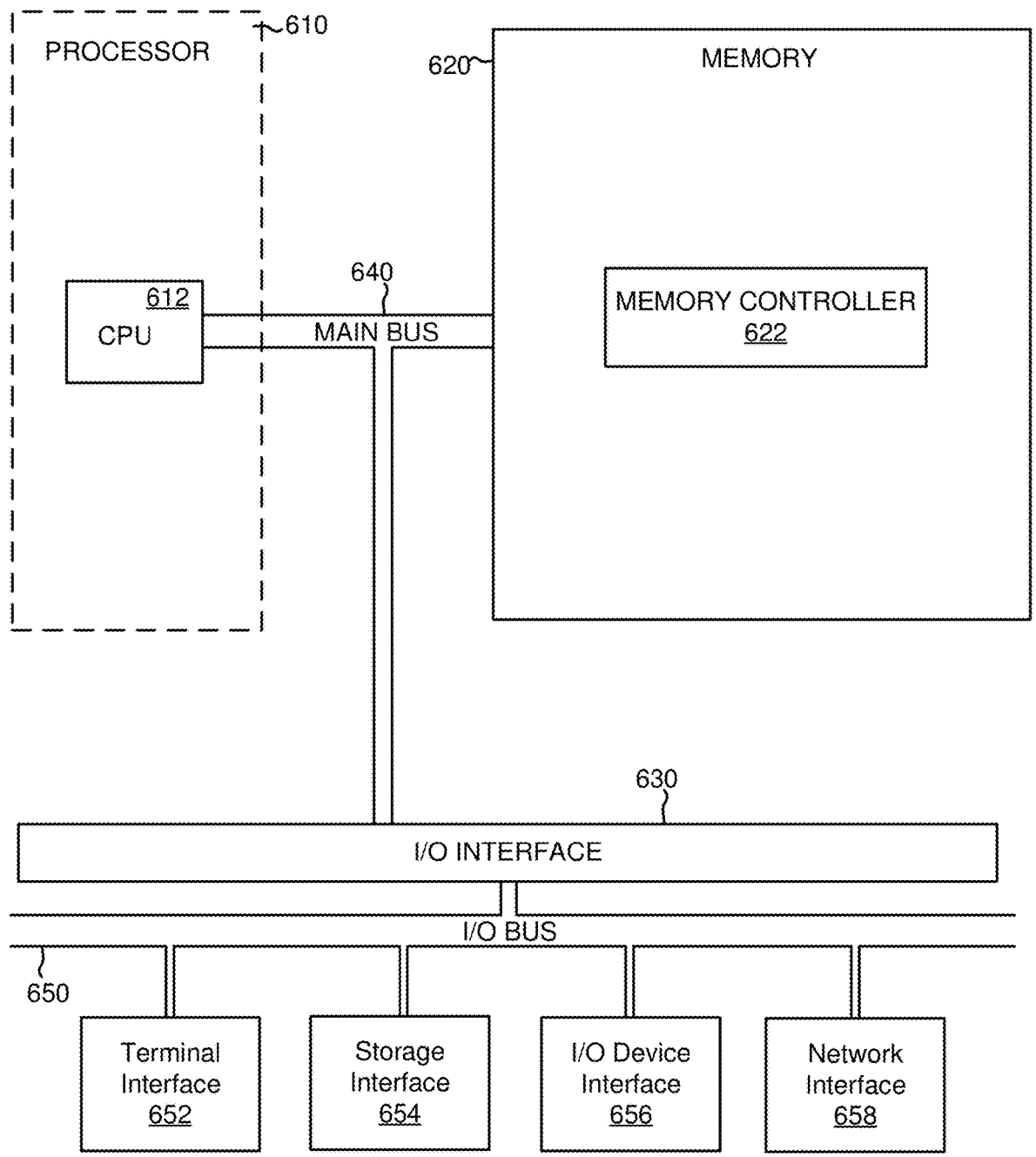
FIG. 6 illustrates the representative major components of a computer system that may be used in accordance with embodiments.

FIG. 6 depicts the representative major components of an example Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or nonvolatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may include a subset of the aforementioned interfaces (e.g., an embedded computer system in an industrial application may not include the Terminal Interface 652 and the Storage Interface 654).

Logic modules throughout the Computer System 601— including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
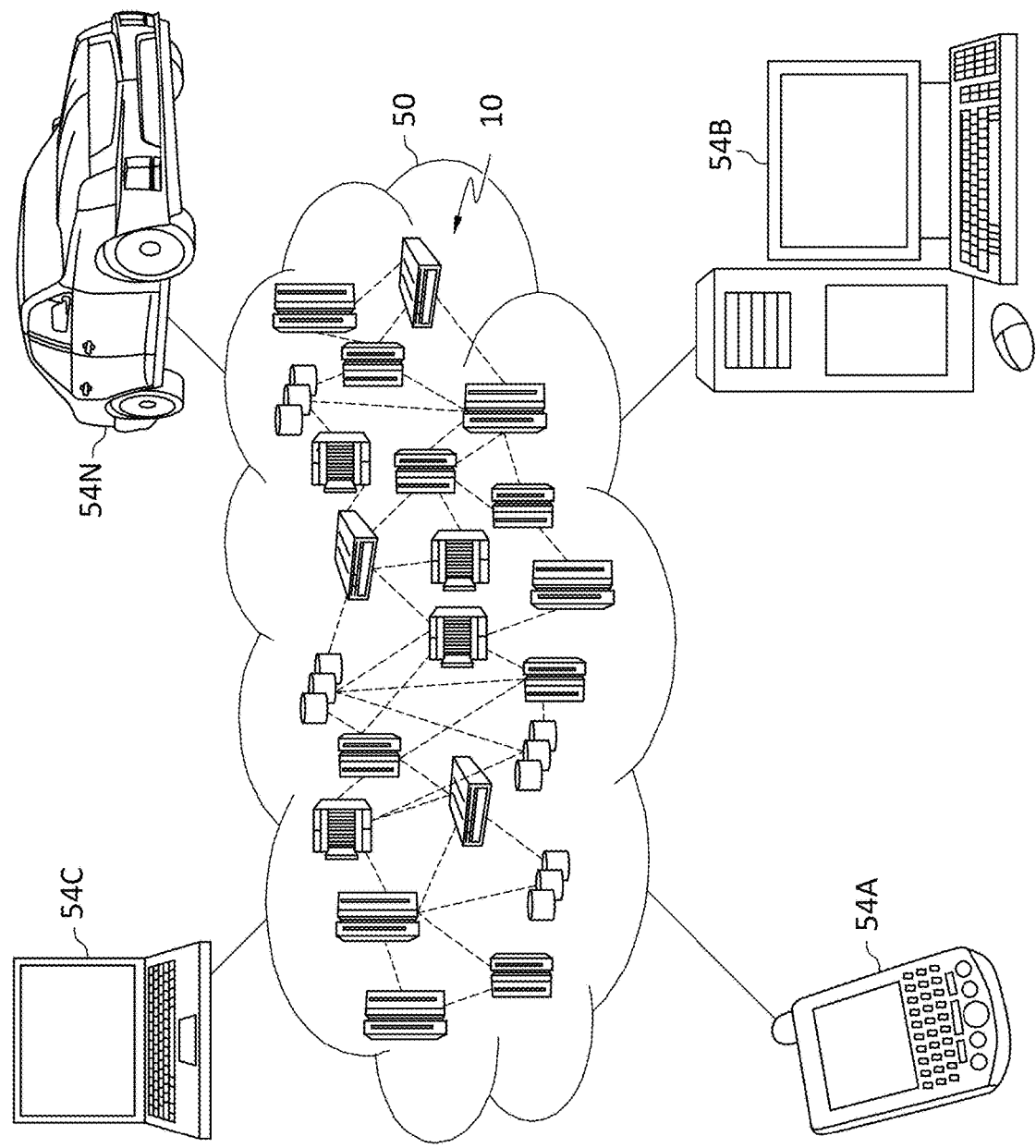
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
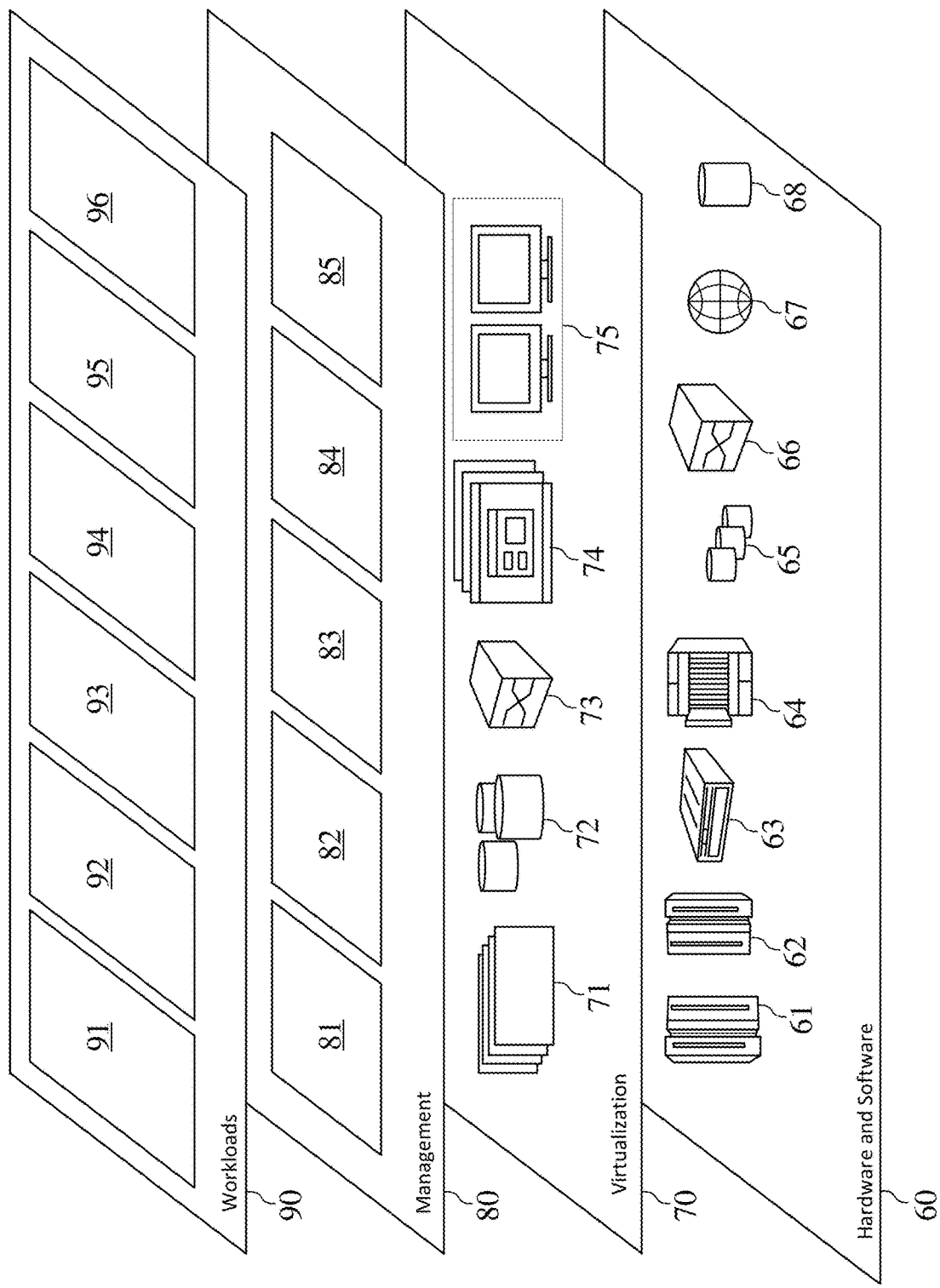
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "set" of an object does not equate to all available instances of that object. For example, if four files were available, a set of files may not contain all four files. Further, as used herein, the phrase "each of a set" of an object refers only to the instances of that object of that set. For example, if four files were available, the phrase "a set of two files from the four files, each of the files in the set being read only" would properly be interpreted as implying that two files (the two files in the set) are read only. The two files of the four available files that are not in the set may or may not be read only.

The descriptions of the various embodiments of the present disclosure have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions embodied therewith, the program instructions executable by a computer to cause the computer to:
   receive a data store for a linear asset comprising historical weather data, predicted weather data, historical linear asset variable values, historical linear asset degradation data, and historical failure data associated with a plurality of linear asset segments;
   identifying relevant segments of a linear asset to a current segment of the linear asset,
      wherein the relevant segments are one or more adjacent segments of the linear asset with relevance of multiple sensor readings on a distance of the sensor from possible relevant linear asset section,
      wherein the relevance of a segment is determined by distinguishing segments with relevant weather data from those with dissimilar weather data;

train, by a comparison engine using regression analysis using a supervised learning technique of backpropagation, a supervised learning model in a multilayer perceptron neural network based on a correlation of the historical linear asset degradation data with multiple layers and non-linear activation to the historical weather data and the historical linear asset variable values of the relevant segments to distinguish data that is not linearly separable and find links between linear asset degradation and a combination of the historical weather data and the historical linear asset variable values of the relevant segments,
    wherein the supervised learning model is configured to operate with one or more weather variables;

determine, by the multilayer perceptron neural network with the supervised learning model, a predicted linear asset degradation variable value for a first linear asset segment of the plurality of linear asset segments based on the predicted weather data and the selected weather variables in comparison to the historical linear asset degradation data; compare the historical weather data and the historical linear asset variable values to the historical failure data;

predict, by the multilayer perceptron neural network using the supervised learning model, a deterioration failure probability for the first linear asset segment based on predicted weather data and the predicted linear asset variable value;

populate a map with the predicted deterioration failure probabilities; and provide, to a user, a recommendation to perform servicing on the first segment based on the deterioration failure probability;

in response to the sensor readings, update periodically failure reports for one or more line asset sections;

generating, by one or more processors, a map graphically displaying on a screen a predicted linear asset segment failure rate, wherein the generating map display uses animated indicators rapidly blinking line indicates the linear asset segment needs servicing, a slowly blinking line indicates that the linear asset segment needs servicing, and a solid line indicates that the linear asset segment does not need servicing; and generating a map graphically displaying a predicted linear asset segment failure rate.

2. The computer program product of claim 1, wherein the historical linear asset variable values consist of historical sensor data for one or more sensors at one or more of the linear asset segments.

3. The computer program product of claim 1, comparing the results of the prediction for the first linear asset segment to a second adjacent linear asset segment to determine a relative segment score,
    determining that the relative segment score is denotes a correlation between the first linear asset segment and the adjacent segment,
        wherein the determining is performed based on predicted weather data for the first linear asset segment and the adjacent linear asset segment.

4. The computer program product of claim 1,
    wherein the historical weather data includes weather data from a weather service for a geographical region of the first linear asset segment; and
    wherein the predicted weather data includes weather predictions from the weather service for the geographical region of the first linear asset segment.

5. The computer program product of claim 1, wherein the regression analysis is a Spearman rank correlation.

6. The computer program product of claim 1:
    excluding one or more irrelevant weather variables based on the comparing.

7. The computer program product of claim 1, wherein the supervised learning model is trained to predict failures for the linear assets by:
    receiving annotated training data; and
    propagating training data through the network, identifying output errors, and altering the network to address the output error.

8. The computer program product of claim 7, further comprising:
    recognizing patterns in the annotated training data;
    comparing the recognized patterns to annotated patterns in the annotated data;
    identifying, based on the comparing, one or more mismatches between the recognized patterns and the annotated patterns;
    reviewing a neural network architecture of the supervised learning model to identify one or more neurons that contribute to the mismatch; and
    updating the identified neurons.

9. A system comprising:
a processor; and
a memory in communication with the processor, the memory containing program instructions that, when executed by the processor, are configured to cause the processor to perform a method, the method comprising:
receiving a data store for a linear asset comprising historical weather data, predicted weather data, historical linear asset variable values, and historical failure data associated with a plurality of linear asset segments;
identifying relevant segments of a linear asset to a current segment of the linear asset,
    wherein the relevant segments are one or more adjacent segments of the linear asset with relevance of multiple sensor readings on a distance of the sensor from possible relevant linear asset section,
    wherein the relevance of a segment is determined by distinguishing segments with relevant weather data from those with dissimilar weather data;
training, by a comparison engine using regression analysis using a supervised learning technique of backpropagation, a supervised learning model in a multilayer perceptron neural network based on a correlation of the historical linear asset degradation data with multiple layers and non-linear activation to the historical weather data and the historical linear asset variable values of relevant segments to distinguish data that is not linearly separable and find links between linear asset degradation and a combination of the historical weather data and the historical linear asset variable values of the relevant segments,
    wherein the supervised learning model is configured to operate with one or more weather variables;
determining, by the multilayer perceptron neural network with the supervised learning model, a predicted linear asset degradation variable value for a first linear asset segment of the plurality of linear asset segments based on the predicted weather data and the selected weather variables in comparison to the historical linear asset degradation data;
comparing the historical weather data and the historical linear asset variable values to the historical failure data;

predicting, by the multilayer perceptron neural network using the supervised learning model, a deterioration failure probability for the first linear asset segment based on the predicted weather data and the predicted linear asset variable value;

populate a map with the predicted deterioration failure probabilities;

providing, to a user, a recommendation to perform servicing on the first segment based on the deterioration failure probability;

in response to the sensor readings, update periodically failure reports for one or more line asset sections;

generating, by one or more processors, a map graphically displaying on a screen a predicted linear asset segment failure rate, wherein the generating map display uses animated indicators rapidly blinking line indicates the linear asset segment needs servicing, a slowly blinking line indicates that the linear asset segment needs servicing, and a solid line indicates that the linear asset segment does not need servicing; and generating a map graphically displaying a predicted linear asset segment failure rate.

10. The system of claim 9, wherein the historical linear asset variable values consist of historical sensor data for one or more sensors at one or more of the linear asset segments.

11. The system of claim 9, wherein the determining is performed based on predicted weather data for the first linear asset segment and one or more adjacent linear asset segments.

12. The system of claim 9,
wherein the historical weather data includes weather data from a weather service for a geographical region of the first linear asset segment; and
wherein the predicted weather data includes weather predictions from the weather service for the geographical region of the first linear asset segment.

13. The system of claim 9, wherein the regression analysis is a Spearman rank correlation.

* * * * *